United States Patent
Guering (12)

(10) Patent No.: US 9,399,517 B2
(45) Date of Patent: Jul. 26, 2016

(54) SEATING DEVICE COMPRISING A FORWARD-FOLDABLE BACKREST

(71) Applicant: Airbus Operations (SAS), Toulouse (FR)

(72) Inventor: Bernard Guering, Montrabe (FR)

(73) Assignee: AIRBUS OPERATIONS SAS, Toulouse (FR)

(*) Notice: Subject to any disclaimer, the term of this patent is extended or adjusted under 35 U.S.C. 154(b) by 3 days.

(21) Appl. No.: 14/100,771

(22) Filed: Dec. 9, 2013

(65) Prior Publication Data

US 2014/0159444 A1      Jun. 12, 2014

(30) Foreign Application Priority Data

Dec. 12, 2012   (FR) ...................................... 12 61917

(51) Int. Cl.
| | |
|---|---|
| *B60N 2/14* | (2006.01) |
| *B60N 2/30* | (2006.01) |
| *B64D 11/06* | (2006.01) |
| *A47C 9/02* | (2006.01) |
| *B60N 2/46* | (2006.01) |
| *B60N 2/16* | (2006.01) |
| *B60N 2/24* | (2006.01) |

(52) U.S. Cl.
CPC ................ *B64D 11/06* (2013.01); *A47C 9/025* (2013.01); *B60N 2/14* (2013.01); *B60N 2/163* (2013.01); *B60N 2/305* (2013.01); *B60N 2/3011* (2013.01); *B60N 2/464* (2013.01); *B60N 2/4646* (2013.01); *B64D 11/0611* (2014.12); *B60N 2002/247* (2013.01)

(58) Field of Classification Search
CPC ......... B60N 2/14; B60N 2/305; B60N 2/3011
USPC .................... 297/325–329, 331, 195.11, 232, 297/344.12, 344.21, 411.32, 411.37
See application file for complete search history.

(56) References Cited

U.S. PATENT DOCUMENTS

| | | | | |
|---|---|---|---|---|
| 1,353,708 | A | * | 9/1920 | Barnett ........................ 297/322 |
| 2,841,212 | A | * | 7/1958 | De Vos et al. ................ 297/113 |
| 3,593,954 | A | * | 7/1971 | Ritchie et al. ................ 248/215 |
| 3,754,787 | A | | 8/1973 | Garber |
| 4,552,404 | A | | 11/1985 | Congleton |
| 4,607,882 | A | * | 8/1986 | Opsvik .................... 297/195.11 |
| 4,630,864 | A | * | 12/1986 | Toll .............................. 297/232 |

(Continued)

FOREIGN PATENT DOCUMENTS

| | | |
|---|---|---|
| EP | 1654507 | 4/2006 |
| JP | 2009017927 | 1/2009 |
| WO | 8501643 | 4/1985 |

OTHER PUBLICATIONS

French Search Report, Jun. 5, 2013.

*Primary Examiner* — Timothy J Brindley
(74) *Attorney, Agent, or Firm* — Greer, Burns & Crain Ltd.

(57) ABSTRACT

A seating device with reduced bulk, for example for an aircraft. This seating device comprises a backrest which describes a circular translational movement towards the front and upwards of the device when the seating device is brought to the retracted configuration. A seating structure is provided comprising a bearing piece on which are fixed, side by side, a plurality of seating devices with reduced bulk. An aircraft is provided comprising a seating device with reduced bulk mounted in its cabin.

16 Claims, 2 Drawing Sheets

(56) References Cited

U.S. PATENT DOCUMENTS

| | | | |
|---|---|---|---|
| 5,407,249 A * | 4/1995 | Bonutti | 297/411.35 |
| 5,597,207 A * | 1/1997 | Bergsten et al. | 297/411.35 |
| 6,076,891 A * | 6/2000 | Bernhardt | 297/411.31 |
| 6,948,774 B2 * | 9/2005 | Maier et al. | 297/411.31 |
| 7,252,336 B2 * | 8/2007 | Frisina | 297/340 |
| 7,328,930 B2 * | 2/2008 | Aufrere et al. | 296/65.09 |
| 7,716,797 B2 * | 5/2010 | Kismarton et al. | 29/91.1 |
| 8,132,861 B2 * | 3/2012 | Cone | 297/411.32 |
| 8,403,352 B2 * | 3/2013 | Hunziker | 280/304.1 |
| 2003/0151288 A1 * | 8/2003 | Deisig | 297/313 |
| 2003/0209929 A1 * | 11/2003 | Muin et al. | 297/331 |
| 2005/0046255 A1 * | 3/2005 | Bressler et al. | 297/326 |
| 2006/0175874 A1 * | 8/2006 | Welch et al. | 297/15 |
| 2006/0232109 A1 * | 10/2006 | Olano | 297/195.11 |
| 2007/0001474 A1 * | 1/2007 | Aufrere et al. | 296/65.01 |
| 2007/0085404 A1 * | 4/2007 | Chen et al. | 297/411.38 |
| 2007/0164594 A1 * | 7/2007 | Yang | 297/411.32 |
| 2008/0265644 A1 | 10/2008 | Delleman et al. | |
| 2009/0186747 A1 * | 7/2009 | Lokken et al. | 482/51 |
| 2009/0230744 A1 * | 9/2009 | Szybisty et al. | 297/335 |
| 2010/0141004 A1 * | 6/2010 | Zeimis et al. | 297/336 |
| 2010/0207354 A1 * | 8/2010 | Hunziker | 280/304.1 |
| 2011/0049953 A1 * | 3/2011 | Champ | 297/326 |
| 2011/0062761 A1 * | 3/2011 | Seibold et al. | 297/378.14 |
| 2011/0109135 A1 * | 5/2011 | Davis et al. | 297/217.4 |
| 2012/0235454 A1 * | 9/2012 | Geismar et al. | 297/239 |
| 2012/0261954 A1 * | 10/2012 | Khalil et al. | 297/188.01 |
| 2013/0113255 A1 * | 5/2013 | Glaser et al. | 297/340 |
| 2013/0214581 A1 * | 8/2013 | Flucht et al. | 297/378.1 |
| 2013/0334846 A1 * | 12/2013 | Bahneman et al. | 297/195.11 |

* cited by examiner

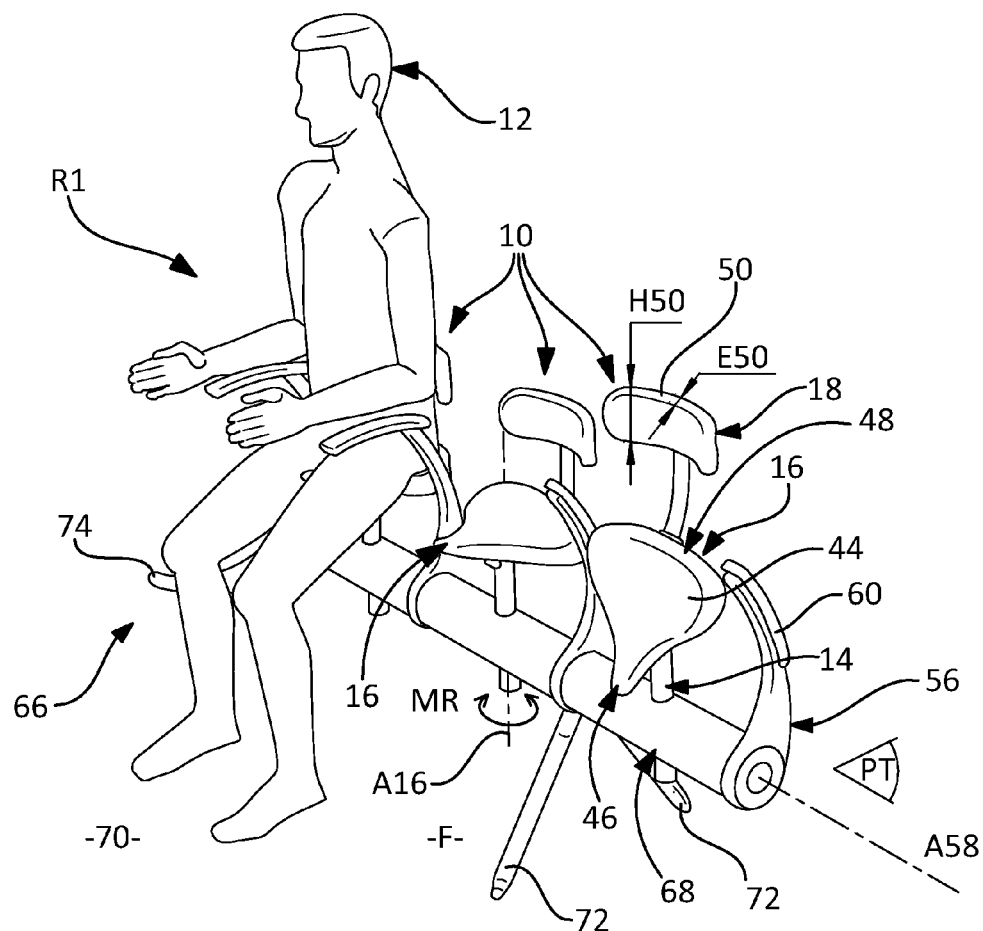
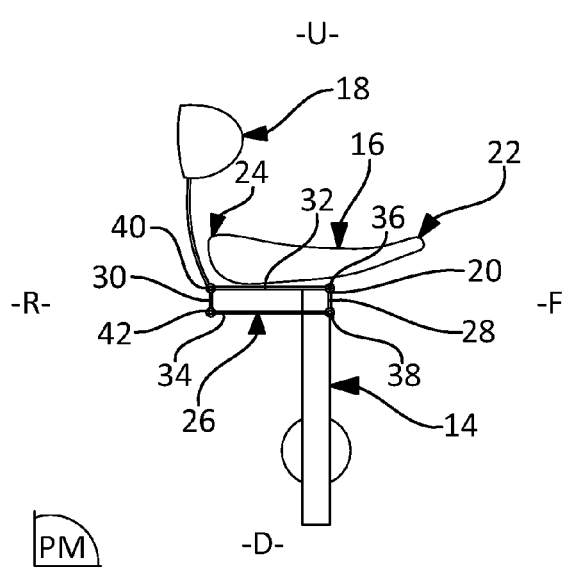
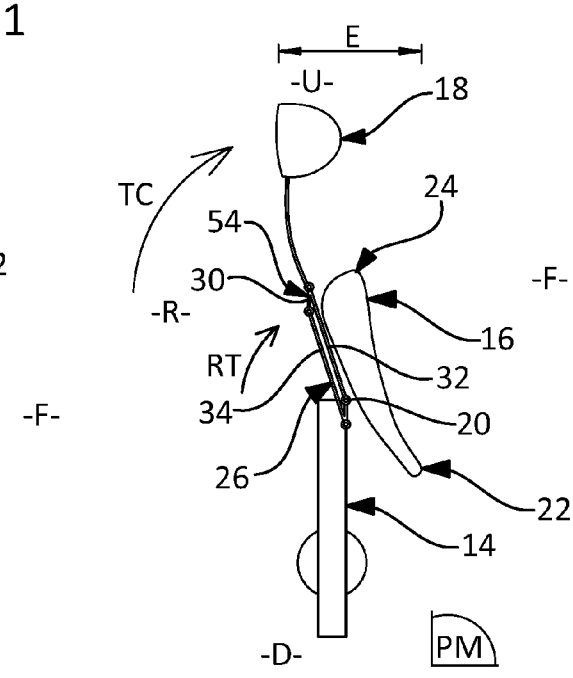
Fig.1
Fig.2
Fig.3

SEATING DEVICE COMPRISING A FORWARD-FOLDABLE BACKREST

CROSS-REFERENCES TO RELATED APPLICATIONS

This application claims the benefit of the French patent application No. 12 61917 filed on Dec. 12, 2012, the entire disclosures of which are incorporated herein by way of reference.

BACKGROUND OF THE INVENTION

The present invention relates to a seating device with reduced bulk, for example for an aircraft.

In the aeronautical sector, some so-called "low-cost" airlines seek to increase the number of passengers transported on each flight, and more particularly on short-haul links, in order to maximize the return on the use of the aircraft.

To that end, and by using the same aircraft or an aircraft of similar capacity, the number of seats in the cabin must be increased.

In all cases, this increase in the number of seats is achieved to the detriment of the comfort of the passengers.

In effect, to increase the number of cabin seats, the space allotted to each passenger must be reduced.

However, this reduced comfort remains tolerable for the passengers in as much as the flight lasts only one or a few hours.

According to a first solution aiming to increase the number of cabin seats, it is possible to reduce the seating width allotted to each passenger in order to place an additional seat in the width of the cabin.

This first solution has already been pursued, and it is now no longer possible to further reduce the seating width, particularly in economy class.

According to a second solution aiming to increase the number of cabin seats, it is possible to reduce the distance available between two seats, that is to say the distance needed for the legs of the passenger.

This second solution has also been pursued hitherto, and it is difficult to continue to further reduce this distance between the seats because of the increase in the average size of the passengers.

According to a third solution aiming to increase the number of cabin seats, the design of the seats has to be optimized so that they present the smallest possible bulk.

This third solution has also been pursued by the engineers of the aeronautical sector.

While developing these three solutions aiming to increase the number of cabin seats, the engineers became aware that it was becoming increasingly difficult for the passengers to access the seating places located at the end of a row of seats, on the window side.

This access difficulty is mainly due to the reduced distance between two seats, and more specifically to the reduced distance between the seating of a first seat and the backrest of another seat situated in front of the first.

Also, the difficulty in accessing the seating places situated at the end of a row also stems from the presence of the armrests.

Also, to remedy such access difficulties, it is common practice, in an aircraft or in other people transport means, to provide seats with armrests and a seating that can be raised, that is to say rotationally mounted so as to be able to be retracted upwards towards the backrest of the seat.

This known solution meets its limits when seeking to increase the number of seats in an aircraft cabin.

In practice, despite the many enhancements made to the aircraft seats, the retracted-up seating still has a certain thickness which remains cumbersome for access to the seating places situated at the end of a row, on the window side.

Furthermore, since the backrest of the seats with raisable armrests and seating remains fixed, it does not make it possible to free up any access to the seating places situated behind.

SUMMARY OF THE INVENTION

Thus, the present invention aims to mitigate the drawbacks of the prior art.

To this end, the invention proposes a seating device with reduced bulk for an aircraft.

This seating device comprises a support supporting a seating and a backrest, and this seating device can assume different configurations of use offering a seating place, as well as a retracted configuration offering a reduced bulk.

Also, this seating device is characterized in that its backrest describes a circular translational movement towards the front and upwards of the device when the seating device is brought to the retracted configuration.

By virtue of these kinematics, the backrest makes it possible to widen the access to the seating places situated behind when the seating device is in the retracted configuration.

It also becomes possible, by virtue of this particular mobility of the backrest, to further reduce the distance between different rows of seating devices in an aircraft cabin.

By virtue of the circular translational movement towards the front and upwards of the device when the seating device is retracted, the backrest is located in the vertical extension of the support when the seating device is in the retracted configuration.

Furthermore, the seating rotationally tilts so that its front end is moved downwards and towards the rear, and its rear end is moved upwards and towards the front when the seating device is retracted.

Thus, the seating is located between the backrest and the support, substantially in the vertical extension of these two elements, when the seating device is in the retracted configuration.

To obtain these movements of the backrest and of the seating, the seating and the backrest of the seating device are mounted on a deformable parallelogram-shaped support structure.

In more detail, the deformable parallelogram-shaped support structure comprising a front stay and a rear stay linked by a top stay and a bottom stay, the front stay and the rear stay are formed respectively by the support and by the backrest, and the seating is fixed to the top stay of the deformable parallelogram-shaped support structure.

In order to reduce the bulk of the seating device in the retracted configuration and to reduce the distance needed to accommodate the legs of the passengers between two rows of seating devices, the seating takes the form of a motorcycle-type saddle.

Still with a view to reducing the bulk of the seating device in the retracted configuration, the backrest takes the form of a simple lumbar support held at the end of an arm.

Furthermore, the seating can offer a rotational mobility about a vertical axis relative to the support, and the support can incorporate means for adjusting the seating height, these features making it possible to indirectly reduce the distance needed between two rows of seating devices.

To add to the seating comfort of the passenger, the seating device comprises a raisable armrest with an arm rotationally mounted about an axis of the support.

Advantageously, this armrest comprises a support element for a forearm mounted on a slideway at the end of the rotary arm, which makes it possible to press the support element onto the arm to minimize the bulk of the armrest once the latter is raised.

The present invention also covers a seating structure comprising a bearing piece, preferably a tube, on which are fixed, side by side, a plurality of seating devices, as well as an aircraft comprising a seating device.

BRIEF DESCRIPTION OF THE DRAWINGS

Other features and advantages will emerge from the following description of the invention, a description which is given purely as an example, in light of the appended drawings in which:

FIG. 1 is a perspective view of a seating structure comprising a plurality of seating devices, this view illustrating the invention, FIG. 2 and FIG. 3 are schematic views respectively representing a seating device in the seating configuration and in the retracted configuration, these views illustrating the invention.

DETAILED DESCRIPTION OF THE PREFERRED EMBODIMENTS

Figure 4:
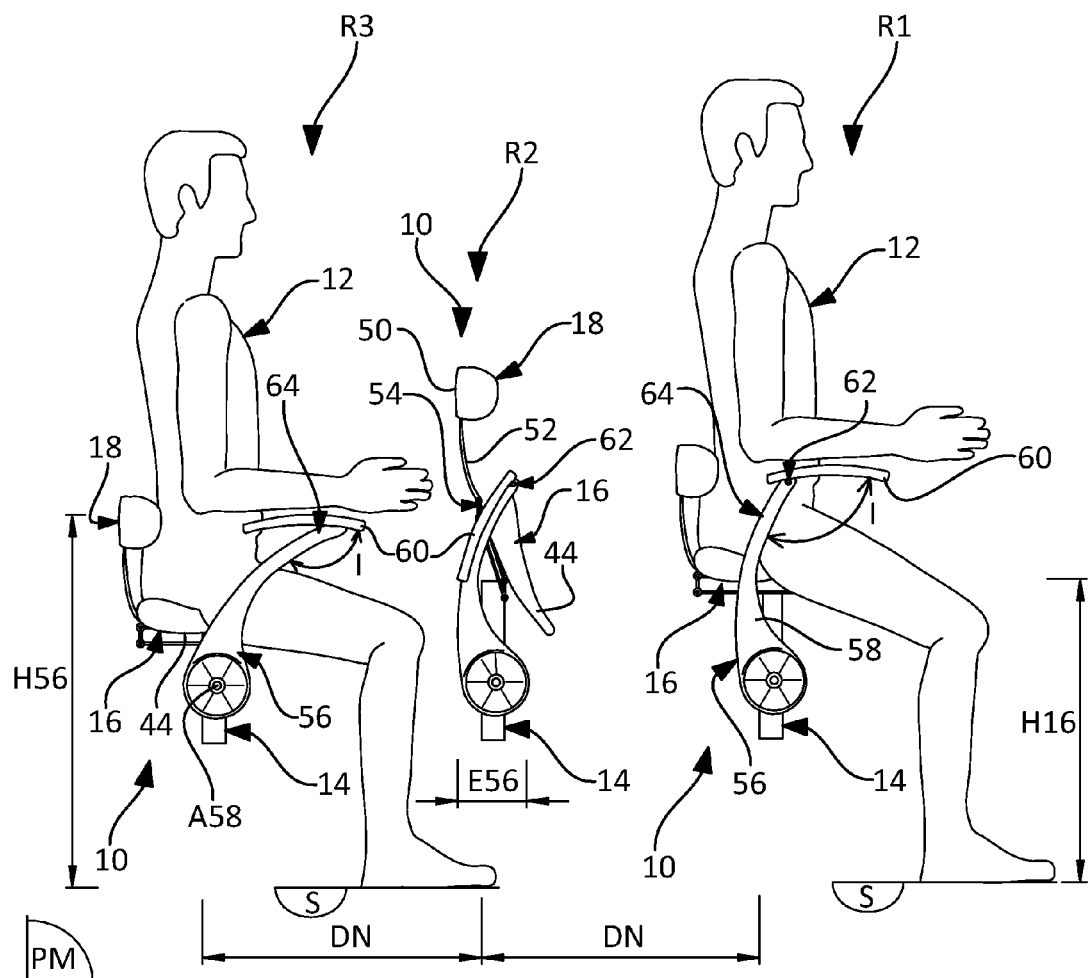
FIG. 4 is a side view of a plurality of rows of seating devices, this view illustrating the invention.

As illustrated in FIG. 1, the present invention relates to a seating device 10 with reduced bulk.

This seating device 10 is particularly intended for use in an aircraft cabin to receive a maximum number of passengers 12.

Obviously, this aeronautical application is non-limiting, and the seating device 10 according to the invention could perfectly well be used in other transport means in which the aim is to transport a maximum number of passengers, such as coaches or trains.

As is known, the seating device 10 comprises a support 14 supporting a seating 16 and a backrest 18.

According to the invention, the seating device 10 can assume different configurations of use offering a seating place, such as that illustrated by FIG. 2, and a retracted configuration offering a reduced bulk, this retracted configuration being illustrated in FIG. 3.

More precisely, a configuration of use of the device 10 offers a substantially horizontal seating 16, the different configurations of use being linked to the height adjustment and to the rotational adjustment of the device 10 about a vertical axis, as detailed later.

Thus, when the seating device 10 is brought to the retracted configuration, its backrest 18 is moved towards the front F of the device 10.

By virtue of this movement towards the front F, the backrest 18 makes it possible to free up access to the seating places situated at the rear R of the device 10.

More specifically, the backrest 18 describes a circular translational movement TC towards the front F and upwards U of the device 10 when the seating device 10 is brought to the retracted configuration.

"Circular translation" should be understood to mean that the invention intends the backrest 18 to describe a planar movement such that all the points of the backrest 18 have circular trajectories of the same radius but of different centers.

This circular translational movement makes it possible to maintain the backrest 18 in the same substantially vertical position regardless of the configuration assumed by the device 10.

Thus, regardless of the configuration assumed by the device 10, the backrest 18 provides the passenger with a lumbar support.

"Vertical" should be understood to mean a direction that goes from the bottom D of the device 10 to the top U of the device 10, and "horizontal" should be understood to mean a direction that goes from the rear R of the device 10 to the front F of the device 10.

Preferably, the backrest 18 describes a circular translational movement TC in a median plane PM of the device 10, the median plane PM separating the device 10 into two halves, right and left.

By virtue of this particular movement TC, the backrest 18 is located substantially in the vertical extension of the support 14, which reduces the bulk E of the device in the retracted position.

Still by virtue of this circular translational movement TC, the backrest 18 is moved away from the support 14 to allow the seating 16 to be retracted.

In practice, according to the invention, the seating 16 rotationally tilts RT about an axis 20 of the support 14 so that its front end 22 is moved downwards D and towards the rear R of the device 10, and its rear end 24 is moved upwards U and towards the front F of the device 10 when the seating device 10 is brought to the retracted configuration.

By virtue of this rotation RT, the seating 16 is located between the backrest 18 and the support 14 when the seating device 10 is in the retracted configuration, which reduces the bulk E of the device in the retracted position.

To minimize this bulk E of the device in the retracted position, the seating 16 is located partially in the vertical extension of the backrest 18 and of the support 14 when the seating device 10 is in the retracted configuration.

Preferably, the seating 16 describes its rotational movement RT in a median plane PM of the device 10, the axis of rotation 20 being at right angles to the median plane PM.

In a preferred arrangement of the seating device 10, the seating 16 and the backrest 18 of the seating device 10 are mounted on a deformable parallelogram-shaped support structure 26.

This deformable parallelogram-shaped support structure 26 makes it possible to obtain, mechanically and in a compact manner, the specific movements of the seating 16 and of the backrest 18 described above.

This deformable parallelogram-shaped support structure 26 comprises a front stay 28 and a rear stay 30 linked by a top stay 32 and a bottom stay 34.

More specifically, the front stay 28 is linked by a top front hinge 36 to the top stay 32, the front stay 28 is linked by a bottom front hinge 38 to the bottom stay 34, the rear stay 30 is linked by a top rear hinge 40 to the top stay 32, and the rear stay 30 is linked by a bottom rear hinge 42 to the bottom stay 34.

In a preferred arrangement of the seating device 10, the front stay 28 and the rear stay 30 are formed respectively by the support 14 and by the backrest 18. There is thus obtained a very compact arrangement of the deformable parallelogram-shaped support structure 26, and consequently of the seating device 10.

Still in a preferred arrangement of the seating device 10, the seating 16 is fixed to the top stay 32 of the deformable parallelogram-shaped support structure 26.

The axis 20 of the support 14 about which the seating 16 rotationally tilts RT is therefore the top front hinge 36 of the deformable parallelogram-shaped support structure 26.

In comparison to an assembly on a slideway, the deformable parallelogram-shaped support structure 26 does not require any fixed guiding piece likely to remain behind the backrest 18 when the seating device 10 is in the retracted configuration.

Advantageously, the deformable parallelogram-shaped support structure 26 comprises return means, such as a spring, for returning to the retracted configuration.

In addition to this arrangement of the device 10, the invention provides for the seating 16 to take the form of a motorcycle-type saddle 44, the shape of this saddle 44 being visible in FIG. 1.

This saddle 44 comprises a front part 46 that is thinner than its rear part 48 and raised relative to the rear part 48.

This saddle 44, offering a better hold for a passenger 12 by virtue of its raised front part 46, makes it possible to raise the seating 16 further by comparison with the aircraft seats with a parallelepipedal seating.

By further raising the seating 16, and as FIGS. 1 and 4 illustrate, the legs of the passenger 12 are less retracted and require less space in relation to the seat in front.

Despite this further raising of the seating, the passenger is seated, and not standing.

As FIG. 4 illustrates, in order to adapt the seating device 10 to passengers 12 of different morphologies, the support 14 incorporates adjustment means, such as a manually controlled spring cylinder system, for adjusting the seating height H16.

The seating height H16 is defined between the ground S, for example the floor of an aircraft cabin, and the seating 16.

The adjustment of the seating height H16 indirectly makes it possible to reduce the necessary distance DN between two rows of seating devices 10.

In practice, this adjustment enables each passenger to adapt the seating height H16 to his or her morphology, and this avoids providing an excessive necessary distance DN for passengers of large size by avoiding having them seated too low.

To refine the comfort of the passenger 12, the seating 16 can also offer a rotational mobility MR, for example by a few tens of degrees, about a vertical axis A16 relative to the support 14.

This rotational mobility MR of the seating 16 about a vertical axis A16 also indirectly makes it possible to reduce the necessary distance DN between two rows of seating devices 10.

In practice, the rotation MR of the seating 16 enables the passenger to find a more ergonomic position so that he or she does not have to feel too close to his or her neighbor in front, and, this rotation MR also enables the passengers to move while being seated to free up the passage to the seating places situated close to the window.

According to the invention, the backrest 18 takes the form of a lumbar support 50 held at the end of an arm 52.

In a preferred arrangement of the seating device 10, the bottom part 54 of the arm 52 constitutes the rear stay 30 of the deformable parallelogram-shaped support structure 26.

As illustrated in FIG. 1, the lumbar support 50, possibly padded, follows a curved profile in a transversal plane PT of the seating device 10 so as to closely follow the anatomy of the back of a passenger, the transversal plane PT separating the device 10 into two halves, top and bottom, and being at right angles to the median plane PM.

In a minimal but sufficient variant, the lumbar support 50 has a height H50 of ten or so centimeters, and a thickness E50 of a few centimeters.

This minimal variant of the lumbar support 50 obviously makes it possible to limit the bulk E of the seating device 10, notably by comparison with the aircraft seats with parallelepipedal backrest of the prior art.

To complement the comfort of a passenger 12, and as illustrated in FIG. 4, the seating device 10 comprises a raisable armrest 56 with an arm 58 rotationally mounted about an axis A58 that is fixed relative to the support 14.

In a known manner, the raisable armrest 56 is mounted alongside the seating 16. Also, in the case of a plurality of seating devices 10 forming a row, as FIG. 1 illustrates, a raisable armrest 56 is provided on each side of each seating device 10.

Preferably, the axis A58 of rotation of the arm 58 is perpendicular to the median plane PM of the device 10.

However, the axis A58 of rotation of the arm 58 is distinct from the axis 20 of rotation of the seating 16.

The armrest 56 comprises a support element 60 for a forearm of a passenger 12 mounted on a slideway 62 at the top end 64 of the arm 58.

Advantageously, the sliding of the support element 60 relative to the arm 58 defines the inclination I of the support element 60 relative to the arm 58, and it makes it possible to keep the support element 60 in a substantially horizontal position.

Furthermore, the rotation of the armrest 56 in combination with the slideway 62 makes it possible to adjust the desired height H56 of the armrest. Also, by rotating the arm 58 of the armrest 56 to a lower position, the slideway 62 makes it possible to keep the armrest 56 in a useable position situated close to the seating 16.

Still by virtue of the slideway 62, the support element 60 can be pressed onto the arm 58 to minimize the bulk E56 of the armrest 56 when it is raised.

The present invention also covers a seating structure 66, illustrated in FIG. 1, comprising a bearing piece 68, preferably a tube, on which are fixed, side by side, a plurality of seating devices 10 so as to form a row R1 of seating places.

Advantageously, the supports 14 of the different seating devices 10 are incorporated in this bearing piece 68 and the raisable armrests 56 are directly rotationally mounted on the bearing piece 68.

The invention also covers an aircraft comprising a seating device 10 mounted in its cabin.

Figure 5:
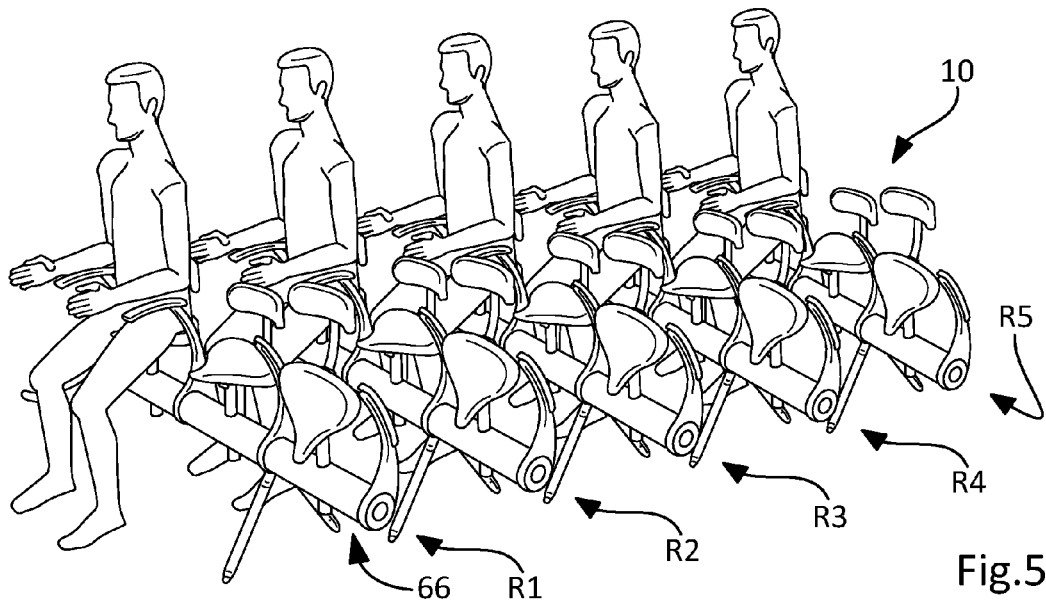
FIG. 5 is a perspective view from above of a plurality of rows of seating devices, this view illustrating the invention.

For example, an aircraft comprises a plurality of seating structures 66 mounted one behind the other in its cabin so as to form a plurality of rows (R1, R2, R3, R4, R5, etc.) of seating places, as represented in FIG. 5.

To this end, the bearing piece 68 of each seating structure 66 is mounted on the floor 70 of the aircraft cabin via connecting rods 72, and a lateral arm 74 linking the bearing piece 68 to the structure of the aircraft in order to take up the torsional forces to which the latter is subjected.

Also, it can be seen that, by comparison with the aircraft seats of the prior art, the seating device 10 according to the invention offers a reduced bulk both when it is in use and when it is retracted.

Furthermore, it is possible to reduce the necessary distance DN between two rows of seating places while preserving the comfort of the passengers, both when they are seated and when they are accessing their place.

To give some idea, by virtue of the design of the seating device 10 according to the invention, it is possible to obtain four rows of seating places in the length in which only three rows of aircraft seats according to the prior art were able to be installed.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A seating device with reduced bulk comprising:
   a support supporting a seating and a backrest,
   the seating device having a plurality of configurations of use offering a seating place and being movable to a retracted configuration offering a reduced bulk,
   the backrest being configured to move towards a front of the seating device when the seating device is moved to the retracted configuration,
   the backrest describing a circular translational movement towards the front and upwards relative to the device when the seating device is moved to the retracted configuration,
   the seating and the backrest of the seating device being mounted on a deformable parallelogram-shaped support structure having a front stay, a rear stay, a top stay and a bottom stay, each stay being pivotally joined to two adjacent stays, the front stay formed by a portion of the support, the rear stay formed by a portion of the backrest,
   wherein the seating rotationally tilts about a horizontal axis positioned on the support so that its front end is moved downwards and towards the rear of the device, and its rear end is moved upwards and towards the front of the device when the seating device is moved to the retracted configuration.

2. The seating device with reduced bulk according to claim 1, wherein the seating is fixed to the top stay of the deformable parallelogram-shaped support structure.

3. The seating device with reduced bulk according to claim 1, wherein the seating comprises a saddle with a front part thinner than a rear part, the front part being raised relative to the rear part in a seating configuration.

4. The seating device with reduced bulk according to claim 1, wherein the backrest comprises a lumbar support held at the end of an arm.

5. The seating device with reduced bulk according to claim 1, wherein the seating has a rotational mobility about a vertical axis relative to the support.

6. The seating device with reduced bulk according to claim 1, wherein the support incorporates means for adjusting the seating height.

7. The seating device with reduced bulk according to claim 1, wherein the seating device comprises an armrest with an arm rotationally mounted about an axis that is fixed relative to the support, the armrest comprising a support element for a forearm of a passenger mounted on a slideway at a top end of the arm.

8. A seating structure comprising a bearing piece on which are fixed, side by side, a plurality of seating devices so as to form a row of seating places, the seating devices each comprising:
   a support supporting a seating and a backrest,
   the seating device having a plurality of configurations of use offering a seating place and being movable to a retracted configuration offering a reduced bulk,
   the backrest being configured to move towards a front of the seating device when the seating device is moved to the retracted configuration,
   the backrest describing a circular translational movement towards the front and upwards relative to the device when the seating device is moved to the retracted configuration,
   the seating and the backrest of the seating device being mounted on a deformable parallelogram-shaped support structure having a front stay, a rear stay, a top stay and a bottom stay, each stay being pivotally joined to two adjacent stays, the front stay formed by a portion of the support, the rear stay formed by a portion of the backrest,
   wherein the seating rotationally tilts about a horizontal axis positioned on the support so that its front end is moved downwards and towards the rear of the device, and its rear end is moved upwards and towards the front of the device when the seating device is moved to the retracted configuration.

9. An aircraft comprising at least one seating device mounted in its cabin, the seating device comprising:
   a support supporting a seating and a backrest,
   the seating device having a plurality of configurations of use offering a seating place and being movable to a retracted configuration offering a reduced bulk,
   the backrest being configured to move towards a front of the seating device when the seating device is moved to the retracted configuration,
   the backrest describing a circular translational movement towards the front and upwards relative to the device when the seating device is moved to the retracted configuration,
   the seating and the backrest of the seating device being mounted on a deformable parallelogram-shaped support structure having a front stay, a rear stay, a top stay and a bottom stay, each stay being pivotally joined to two adjacent stays, the front stay formed by a portion of the support, the rear stay formed by a portion of the backrest,
   wherein the seating rotationally tilts about a horizontal axis positioned on the support so that its front end is moved downwards and towards the rear of the device, and its rear end is moved upwards and towards the front of the device when the seating device is moved to the retracted configuration.

10. The seating structure according to claim 8, wherein the seating has a rotational mobility about a vertical axis relative to the support.

11. The seating structure according to claim 8, wherein the support incorporates means for adjusting the seating height.

12. The seating structure according to claim 8, wherein the seating device comprises an armrest with an arm rotationally mounted about an axis that is fixed relative to the support, the armrest comprising a support element for a forearm of a passenger mounted on a slideway at a top end of the arm.

13. The aircraft according to claim 9, wherein the seating has a rotational mobility about a vertical axis relative to the support.

14. The aircraft according to claim 9, wherein the support incorporates means for adjusting the seating height.

15. The aircraft according to claim 9, wherein the seating device comprises an armrest with an arm rotationally mounted about an axis that is fixed relative to the support, the armrest comprising a support element for a forearm of a passenger mounted on a slideway at a top end of the arm.

16. A seating device with reduced bulk comprising:
a support supporting a seating and a backrest,
the seating device having a plurality of configurations of use offering a seating place and being movable to a retracted configuration offering a reduced bulk,
the backrest being configured to move towards a front of the seating device when the seating device is moved to the retracted configuration,
the backrest describing a circular translational movement towards the front and upwards relative to the device when the seating device is moved to the retracted configuration,
the seating and the backrest of the seating device being mounted on a deformable parallelogram-shaped support structure having a front stay, a rear stay, a top stay and a bottom stay, each stay being pivotally joined to two adjacent stays, the front stay formed by a portion of the support, the rear stay formed by a portion of the backrest,
wherein the support is in the form of a vertically oriented member, the seating having a front end positioned forward of a vertical extension of the support and a rear end positioned rearward of the vertical extension of the support when the seating is in a non-retracted configuration, and being configured to rotationally tilt about a horizontal axis located on a portion of the support so that the front end is moved downwards and closer horizontally to the support and a rear of the device, and the rear end is moved upwards and towards the front of the device so as to move at least a portion of the rear end of the seating into a vertical extension of the support between the support and the backrest when the seating device is moved to the retracted configuration, the backrest being positioned completely rearward of the vertical extension of the support when the seating device is in the non-retracted position and being configured such that as the seating device is moved to the retracted position, at least a portion of the backrest moves into the vertical extension of the support.

* * * * *